April 13, 1965   D. A. PETRINO ETAL   3,178,490
PROCESS FOR PRODUCING A FOAMED PLASTIC
ARTICLE HAVING A DENSE SKIN
Filed Oct. 6, 1961

STEP 1        STEP 2        STEP 3

INVENTORS
DANIEL A. PETRINO
RICHARD L. ELMER
BY James J. O'Connell
attorney

# United States Patent Office 3,178,490
Patented Apr. 13, 1965

3,178,490
PROCESS FOR PRODUCING A FOAMED PLASTIC ARTICLE HAVING A DENSE SKIN
Daniel A. Petrino, Hamilton Square, and Richard L. Elmer, Trenton, N.J., assignors to Thiokol Chemical Corporation, Bristol, Pa.
Filed Oct. 6, 1961, Ser. No. 146,070
10 Claims. (Cl. 264—41)

This invention relates to a novel and simple process for the production of structural foam members possessing skin-like surfaces. In particular, this invention relates to a novel, one-step process for the production of structural foam members which possess an interior of relatively low density foam and relatively dense and strong exterior skin-like surfaces that are smooth, nonporous and relatively impervious to the passage therethrough of water vapor.

Rigid foams made from urethane and other foamable polymer systems have found extensive use as insulation material in the fabrication of containers insulated against temperature changes, such as milk and beverage coolers and containers insulated against shock, such as shipping containers. Foam material used in this manner is commonly bonded to and/or sandwiched between structural members, usually of metal, which act as load bearing and protective members. According to the art, these structural members must be used in combination with the foamed material to support and protect the foamed insulation material which of itself possesses relatively low load bearing and/or impact resistance properties.

The steps usually involved in the fabrication of these prior art articles using such foam material in combination with the structural members include the fabrication of the structural members, the surface preparation of the structural members to adhesively receive the foam material and the foaming of the foam material in place between the structural members or the fabrication of the foam material itself separately and the bonding of the foam material to the structural members. Such procedures are time consuming, technically involved and expensive.

Structural foam members are also disclosed in U.S. 2,767,436 and these possess a smooth, skin-like exterior surface possessing high structural strength, and which enclose a foam material of relatively low density. The procedure used to form these smooth surfaced structural foam members, however, is technically complicated and very uneconomical to operate. The procedure, moreover, is restricted to specific compression molding techniques which by their very nature provide for unusual difficulties in the shaping of complicated or intricate geometries in the parts to be formed thereby.

An object of the present invention, therefore, is to provide a simple method by which structural foam members that possess high compressive strength, unusually low water vapor transmission properties, and a smooth, relatively dense skin-like surface can be formed in substantially a one-step foaming operation. It is another object of this invention to provide a method for the formation of such structural foam members without the need for either external pressure or temperature inducing or controlling means. It is yet another object of this invention to provide a method for the formation of structural foam members whereby the joining of several parts to form the final product is essentially obviated.

It has been unexpectedly found according to the process of the present invention that integrally formed, smooth skinned structural foam members having relatively light foamed interiors and relatively dense, moisture impervious, shell-like surfaces can be readily made in a one-step molding operation if approximately 3 to 10 and preferably 3 to 5 times the normal foaming formulation weight for the given mold is used for the one-step molding process.

By integrally formed it is meant that the unique structure of the foam member produced by the process of the present invention is produced in the mold only by the forces of heat and pressure engendered during its own formation and from the chemical composition of the precursor foaming formulation. A normal foaming formulation is a conventional formulation that would produce a conventional unskinned foam having a density of approximately 2 to 4 lbs./cubic foot when foamed in the mold being used. By smooth it is meant that the surface is essentially continuous and smooth to the touch and unbroken by the cellular-type appearance normally associated with the surface of foamed objects.

Figure 1:
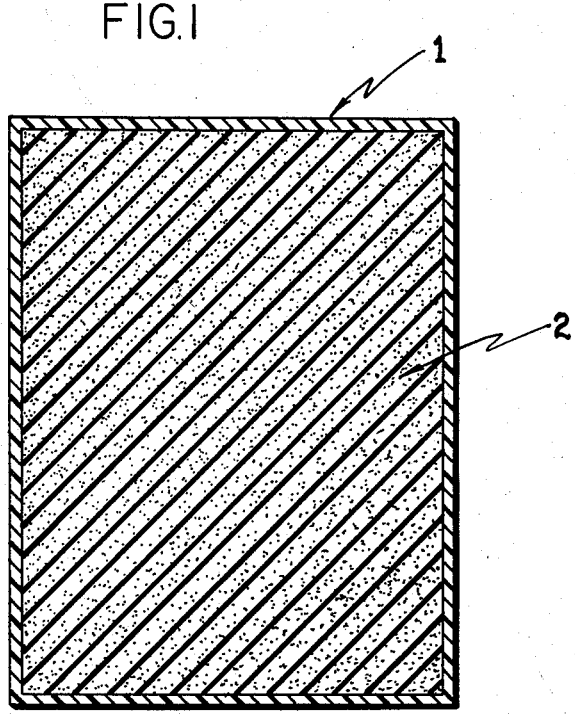
FIGURE 1 is a cross sectional view of a structural foam member made according to the process of the present invention.
Figure 2:
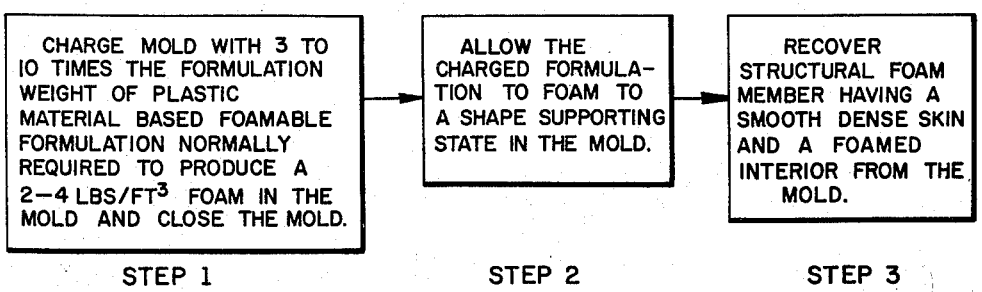
FIGURE 2 is a flow sheet of the process of the present invention which depicts the essentially three step operation involved in the claimed process.

The structural members produced by the process of the present invention, as shown in a cross-sectional view in FIGURE 1, have a smooth surface, nonporous, relatively vapor-impermeable, skin-like surface 1 which is relatively uniform in depth and which completely encloses the substantially uniform, low density foamed center 2. The depth of the surface 1 will vary from approximately $\frac{1}{32}$ to approximately $\frac{1}{4}$ inch and is preferably approximately $\frac{1}{16}$ inch depending on the amount of formulation used to form the structural member. The density of the foamed center will vary from approximately 2 to approximately 4 lbs. per cubic foot and the density of the skin-like surface will vary from approximately 20 to approximately 60 lbs. per cubic foot. The overall density of the structural foam member will vary from approximately 6 to approximately 10 lbs. per cubic foot.

The structural foam member of the present invention can be produced in many shapes and forms. It will assume the shape of the internal contour of the mold in which it is made and its smooth surface is similar to that of a cast object, being smooth and nonporous. The structural foam member of the present invention has a compressive yield strength of at least several hundred pounds per square inch, most of which is contributed by the mechanical strength of the denser casting-like surface skin. The compressive yield strength of the composite structural foam member, in pounds per square inch, is approximately 10 times that of the interior foam and the vapor permeability of the casting-like surface skin, when measured in terms of water vapor transmission in "perm inches," is of the order of 5 to 10% that of the interior foam.

Foamable, plastic material based polymer systems from which the novel rigid foams of the present invention can be produced are well known to the art. Of these systems, including all the known blowing agents which are used therewith, those that are particularly contemplated for use in the novel process of the present invention include those based on urethane, phenolic and epoxy polymers and prepolymers. Urethane based foaming formulations are preferred. The known blowing agent which may be used with these known polymer systems include BL 353 (Du Pont) which is 70% N,N dimethyl N,N dinitroso terephthalamide and 30% (by weight) white mineral oil and fluorocarbon materials such as trichloromonofluoromethane. As noted above the normal weight of the foaming formulation is the amount thereof required to produce a foamed body in the mold having a density of approximately 2 to 4 lbs./ft.³. According to the present invention the large amount of foaming formulation used unexpectedly causes the formation of a molded object which assumes the interior shape of the mold and which has a smooth, relatively hard shell-like skin surface which encloses the much more bulky and much less dense, foamed interior of the molded object. The mold used must be so reconstructed as to be of sufficient strength to withstand the pressure created during the formation of the molded object and to maintain the desired shape which the structural foam member is to assume. If the weight of the cover or other sealing device used to close the mold is not sufficient in and of itself to successfully withstand the pressure created in the mold during the foaming operation and thus insure that the mold will remain closed, clamps or other such means can be used to insure that the mold remains closed during the foaming operation.

In conducting the novel process of the present invention approximately three to ten and preferably three to five times the normal amount of a foaming formulation are charged into a mold, the mold is closed and the formulation is allowed to foam without the application of any exteriorly applied heat. The mold is usually permitted to stand at ambient temperatures for about 30 to 60 minutes during which time the foaming operation and initial cure process takes place. Generally, no special temperature or pressure control need be exercised over the mold or its contents. During the foaming step in the process and depending on the size and construction of the mold and amount of formulation charged therein the temperature of the mold and contents will rise to approximately 160–200° F. due to the exothermic heat of the foaming reaction. Depending on the size of the molded object, the foaming, gelation and curing phenomena have usually progressed to such a state within about 45 minutes after the admission of the formulation to the mold that the mold can be opened and the molded article removed therefrom since it will then be in a state in which it can be readily handled without damage to its shape or structure. The cure of the article is then permitted to continue in air at ambient temperatures for approximately another 24 hours before it is used for load bearing purposes. Before being used, the mold is usually treated with a mold release agent known to the art to facilitate the release of the molded object after the molding operation. The mold may also be preheated before the foaming operation in order to insure the formation of a uniform skin.

According to one embodiment of the process of the present invention, where it is desired to demold the formed article in shorter intervals than 30 minutes, the temperature of the mold and its formed contents is reduced by externally applied cooling means after about 5 minutes from the time of the charging of the foamable composition to the mold cavity and of the closing and securing of the mold, to about 20 to 50 Fahrenheit degrees below that of the temperature of the mold and contents for about 5 to 10 minutes. This will reduce the enormous internal pressures built up in the mold by the foaming process. In this way the molded article can be removed from the mold within about 15 to 30 minutes after the initiation of the foaming process (charging of the mold). The molded object thus produced has substantially the same properties and structure as the molded object produced without externally applied temperature regulating means.

The structural foam members of the present invention can be used as light, exterior insulation curtain wall panels because of their strength and the low vapor permeability qualities of their smooth skinned surface. They can also be used because of their strength, and/or insulation, and/or buoyant and/or vapor impermeability properties for interior insulation partitions for buildings; light weight molds for the cold casting of rubber or plaster; interior bulk walls for milk, beverage, ice cream, meat, etc., coolers and containers; frozen food carry home containers; shipping containers for, in particular, fragile objects; toys and sporting goods, such as boats, surfboards, water skis, floats, life jackets and buoys.

Materials known to the art for imparting fire resistant properties to foamed articles can also be included with the foaming formulations used in the process of the present invention. Such materials would include phosphorous and/or halogen containing materials such as, tris-$\beta$-chloroethyl phosphate; tris-dichloropropyl phosphate; chlorinated biphenyls and polyphenyls; tris(2,3-dibromopropyl) phosphate; tetrabromobisphenol A; tetrabromophthalic anhydride; pentabromophenol and Virol 82 (Virginia Carolina Chemical Corp.) a phosphate based polyol.

The following examples are merely illustrative of the scope of the present invention and are not intended as a limitation thereon.

EXAMPLE 1

An examination is made here of the effect of using one, two, three and five times the conventional formula weight of a conventional urethane foam formulation that was designed originally to yield a conventional 2#/cu. ft. molded foam object in the size mold being used. The proportions by weight of chemical components in the self-extinguishing or fire retardant foam formulation used here remain constant, and just the total quantity of formulation used in the process is varied.

*Table I*

| Chemical component | Parts by weight | Formulation [1] | | | |
|---|---|---|---|---|---|
| | | A-1 | A-2 | A-3 | A-5 |
| Urethane prepolymer [2]—NCO=25%. | 100 | 194.5 | 389.0 | 583.5 | 972.5 |
| N,N,N',N' Tetrakis (2-hydroxypropyl) ethylene diamine | 44 | 85.5 | 171.0 | 256.5 | 427.5 |
| Silicone surfactant ("L/520" marketed by Dow) | 0.5 | 0.97 | 1.94 | 2.91 | 4.85 |
| Trichloromonofluoromethane | 28 | 54.7 | 109.4 | 164.1 | 273.5 |
| Tris-$\beta$-chloroethyl phosphate | 17 | 33.0 | 66.0 | 99.0 | 165.0 |
| Total | 189.5 | 368.67 | 737.34 | 1,106.01 | 1,843.35 |

[1] Formulation A-1 gives the weight in grams of the chemical components required to yield a conventional uniform foam of 2#/cu. ft. density. A-2 gives twice the weight of A-1, A-3 thrice the weight and A-5 five times the weight of A-1.
[2] Urethane prepolymer formed from a trihydroxypolyether (marketed by Wyandotte under the tradename "TP-440") and tolylene diisocyanate.

The aluminum molds used were in the form of a cube of internal dimensions 12" x 24" x 2", with walls ½" thick, split to open along one 12" x 24" face. The molds were fitted with compression screw clamps to secure the removable 12" x 24" top plate.

The foam compositions A-1, A-2, A-3 and A-5 were prepared by blending together the blowing agent, trichloromonofluoromethane and the prepolymer with a mechanical stirrer at temperatures at or less than 60° F. to form one part; the silicone surfactant "L 520" was then added to the crosslinking agent, N,N,N',N' tetrakis (2-hydroxypropyl) diamine and flame retardant, tris-$\beta$-chloroethyl phosphate and then blended at ca. 80° F. to form the second part of the respective compositions. Just prior to addition of these compositions to the mold cavities the two parts of each formulation were blended by stirring the first part into the second part at 1000 r.p.m. for 20 seconds.

The blended compositions A-1, A-2, A-3 and A-5 were then immediately added to the respective mold cavities of separate molds, and the top plates of each were then secured in place with clamps. Blowing of the foams was essentially complete within two to five minutes at ambient temperatures, about 80° F., the foam being in a soft gel-like state. As crosslinking or initial cure of the prepolymer proceeded an exotherm of about 160 to 180° F. developed. Crosslinking of the foam compositions was essentially complete in about 30 to 45 minutes as evidenced by a reduction of the temperature of the molds to about 100 to 110° F. The mold tops were then opened and the foam articles were removed. The latter had a stable geometry, and could be readily handled without damage to its shape of structure.

Post cure of the foamed articles was permitted to proceed at ambient temperatures for an additional 24 hours before testing.

The following table lists the properties of the foamed structures obtained, as described above, from foam compositions A-1, A-2, A-3, A-5 and A-c:

EXAMPLE 3

In this example five times the weight of another conventional fire retardant foam formulation, designed to yield, when used in normal quantity and with prior art methods, foams of 2#/cu. ft. density is used in the process of the present invention to provide structural skin-surfaced foams.

*Table IV*

| Component | Parts by weight | Weight in grams | |
|---|---|---|---|
| | | C-5 [1] | C-c [2] |
| Urethane Prepolymer of Example 1 | 100 | 785 | 157 |
| Hexa-functional Sorbitol (marketed by Atlas under trade name G 2406) | 54 | 423 | 84 |
| Silicone surfactant (as in Example 1) | 0.5 | 3.9 | 0.78 |
| Trichloromonofluoromethane | 32 | 251 | 50.2 |
| Tris-β-chloroethyl phosphate | 25 | 196 | 39.2 |
| Tetramethyl butane diamine | 0.8 | 6.3 | 1.22 |
| Total | 212.3 | 1,165.2 | 333.04 |

[1] Five times the weight needed to produce a conventional 2#/cu. ft. foam.
[2] Conventional 2#/cu. ft. formulation using conventional techniques.

*Table II*

| Property | A-1 | A-2 | A-3 | A-5 | A-c [1] |
|---|---|---|---|---|---|
| Surface skin thickness, inches | No skin | No skin | 7/32 | 7/64 | No skin. |
| Skin density, #/cu. ft. | | | 20.9 | 54.8 | |
| Interior foam density, #/cu. ft. | 2.1 | 3.8 | 2.2 | 3.9 | 2.3. |
| Average density, #/cu. ft. | 2.6 | 4.3 | 5.9 | 10.0 | 2.3. |
| Surface appearance | Foam | Foam | Casting | Casting | Foam. |
| Interior appearance | Uniform foam | Uniform foam | Uniform foam | Uniform foam | Uniform foam. |
| Water vapor, transmission, perm inches (ASTM E 96-53 T): | | | | | |
| One skin (and ½ foam between second skin) | | | 0.76 | 0.17 | |
| Interior foam | 2.75 | 1.39 | 3.29 | 2.86 | 2.75. |
| Compressive yield strength, p.s.i. (ASTM C 364-57): | | | | | |
| Structural foam member | | | 100 | 446 | |
| Interior foam | 48 | 42 | 20 | 48 | 48. |

[1] A-c results are those obtained where an A-1 formulation is foamed by conventional techniques, i.e., in an open reaction chamber.

EXAMPLE 2

In this example, the foam formulations A-5 and A-c of Example 1 was again used, however, the fire retardant, tris-β-chloroethyl phosphate, was omitted. These new formulations are designated B-5 and B-c. The blending procedure and foaming and cure procedures described in Example 1 for A-5 were also used here for B-5 to produce objects having the following properties:

*Table III*

| Property | Foam | |
|---|---|---|
| | B-5 | B-c |
| Surface skin thickness, inches | 1/16 | No skin. |
| Skin density, #/cu. ft. | 48 | |
| Interior foam density, #/cu. ft. | 6 | 1.9. |
| Average density, #/cu. ft. | 8.8 | 1.9. |
| Surface appearance | Casting | Foam. |
| Interior appearance | Uniform foam | Uniform foam. |
| Water vapor transmission (ASTM E 96-53 T): | | |
| One skin (and ½ foam between second skin) | 0.21 | |
| Interior foam | 1.06 | 1.86. |
| Compressive yield strength, p.s.i. (ASTM C 364-57): | | |
| Structural foam member | 330 | |
| Interior foam | 101 | 40.6. |

Using molds and blending and cure procedures as in Example 1, foamed objects were obtained having the following properties:

*Table V*

| Property | Foam | |
|---|---|---|
| | C-5 | C-c |
| Surface skin thickness, inches | 7/32 | No skin. |
| Skin density, #/cu. ft. | 31.1 | |
| Interior foam density, #/cu. ft. | 3.8 | 1.9. |
| Average density, #/cu. ft. | 10.0 | 1.9. |
| Surface appearance | Casting | Foam. |
| Interior appearance | Uniform foam | Uniform foam |
| Water vapor transmission, perm inches (ASTM E 96-53 T): | | |
| One skin (and ½ foam between second skin) | 0.90 | |
| Interior foam | 6.32 | 7.5. |
| Compressive yield strength, p.s.i. (ASTM C 364-57): | | |
| Structural foam member | 230 | |
| Interior foam | 47 | 28. |

EXAMPLE 4

This example illustrates the use of five times the weight of another conventional foam formulation in the process of the present invention to yield structural foam members.

Table VI

| Component | Parts by weight | Weight in grams | |
|---|---|---|---|
| | | D-5 | D-c [1] |
| Urethane Prepolymer of Example 1 | 100 | 1,004 | 201 |
| Tetrahydroxy derivative of pentaerithritol (mol wt. ca. 400) | 60.4 | 604 | 121 |
| Silicone surfactant (as in Example 1) | 0.5 | 5 | 1 |
| Trichloromonofluoromethane | 27 | 272 | 54.4 |
| Tetramethyl butane diamine | 0.75 | 7.5 | 1.5 |
| Total | 188.65 | 1,892.5 | 378.9 |

[1] The weight used to form a 2#/cu. ft. conventional foam.

When the above formulations, D-5 and D-c were blended, blown and used as in the procedures of this invention detailed in Example 1, in a mold with cavity dimensions 12" x 24" x 2", foams were produced with the following properties:

Table VII

| Property | Foam | |
|---|---|---|
| | D-5 | D-c |
| Surface skin thickness, inches | 3/16 | No skin. |
| Skin density, #/cu. ft. | 47.7 | |
| Interior Foam Density, #/cu. ft. | 3.9 | 2.0. |
| Average Density, #/cu. ft. | 11.3 | 2.0. |
| Surface Appearance | Casting | Foam. |
| Interior Appearance | Uniform foam | Uniform foam. |
| Water Vapor Transmission, perm inches (ASTM E 96-53 T): | | |
| One skin (and ½ foam between second skin) | 0.27 | |
| Interior foam | 3.37 | 1.89. |
| Compressive yield strength, p.s.i. (ASTM C 364-57): | | |
| Structural foam member | 649 | |
| Interior foam | 52 | 33. |

EXAMPLE 5

In this example another urethane prepolymer, that formed from a polyether polyol marketed by Atlas under the trade name "PPG 2406" and tolylene diisocyanate and having an —NCO content of about 30% was used according to the following procedure in a foam formulation using five times the conventional quantity required by prior art methods to produce a conventional 2#/cu. ft.: 602 g. of the aforestated urethane polyether polymer was blended at ca. 62° F. with 211 g. of trichloromonofluoromethane, a fluorocarbon blowing agent, to form one part of the two part formulation. The second part was formed by blending 376.5 g. of a polyol crosslinking agent of functionality 6 (marketed as G 2406 by Atlas) with 6.02 g. of the cure accelerator tetramethylbutane diamine and 6.02 g. of the surfactant "D 199" sold by Dow, at 95° F. The two parts were mixed in a vessel using a three bladed propeller type mixer at 1,000±100 r.p.m. for 20 seconds at ambient temperatures. The composition was immediately added to the mold cavity of the mold described in Example 1, the top plate thereof being then secured with screw clamps. Foam formulation and gel cure was permitted to proceed at ambient temperatures for ca. 45 minutes whereupon the mold was opened, and the article, obtained from the formulation described above and designated E-5 below, which could now be handled, was removed. The article, had the contour of the internal geometry of the mold and was permitted to post cure for three days before a comparative test was made between that article and a foam made with a conventional 2#/cu. ft. foam E-c, formed from the above formulation. The properties of the foams thus prepared in these tests are as follows:

Table VIII

| Property | Foam | |
|---|---|---|
| | E-5 | E-c |
| Skin thickness, inches | 0.048 | No skin. |
| Surface appearance | Casting | Foam. |
| Interior appearance | Uniform foam | Uniform foam. |
| Water vapor transmission, perm inches (ASTM E 96-53 T): | | |
| One skin (and ½ foam between second skin) | 0.58 | |
| Interior foam | 3.3 | 4.0. |
| Compressive yield strength, p.s.i. (ASTM C 364-57): | | |
| Structural foam member | 213 | |
| Interior foam | 58 | 40. |

EXAMPLE 6

Various attempts have been made to obtain skin-surfaced structural foams by changing the proportion of formulation components, such as the relative amount of blowing agent used. This technique is commonly used in prior art methods to vary the density of conventional foam.

In this example, formulation A-2 of example 1 was used to prepare a foamed article. However, the amount of blowing agent, trichloromonofluoromethane, was doubled over that used in Example 1, i.e., 218.8 g. were used rather than 109.4 g. The blowing and cure procedures of Example 1 were again followed to produce a foamed article. The latter had a foam-like rather than a casting-like or skin surface, a cell structure that was not uniform (there being large voids evident), and an average density of ca. 3#/cu. ft.

We claim:

1. A process for producing an integrally formed, smooth skinned structural foam member which comprises charging a mold with a plastic material based foamable formulation, said formulation containing approximately 3 to 10 times the formulation weight normally required to form a foamed mass having a density of approximately 2 to 4 pounds per cubic foot in said mold, closing said mold, allowing said foamable formulation to foam to a shape supporting state and recovering the resulting structural foam member from said mold.

2. A process as in claim 1 in which said foamable formulation contains approximately 3 to 5 times the formulation weight normally required to form a foamed mass having a density of approximately 2 to 4 pounds per cubic foot in said mold.

3. A process as in claim 1 in which said structural foam member has a surface density of approximately 20 to 60 pounds per cubic foot and an interior density of approximately 2 to 10 pounds per cubic foot.

4. A process as in claim 1 in which said foamable formulation is based on a curable polymer selected from the group consisting of urethane, epoxy and phenolic polymers and prepolymers.

5. A process as in claim 4 in which said foamable formulation is based on a curable urethane prepolymer.

6. A process as in claim 1 in which said foamable formulation contains a fire retardant agent which imparts fire retardant properties to the structural foam member.

7. A process as in claim 1 in which said foamable formulation is allowed to begin to foam at room temperature and the foaming and formation of the structural foam member is allowed to continue to completion at the internal temperature and pressure of the foaming system.

8. A process as in claim 1 further comprising reducing, for approximately 5 to 10 minutes after said mold has been charged and closed approximately 5 minutes, the temperature of the mold and its contents approximately 20 to 50 Fahrenheit degrees below the temperature of said mold and its contents prior to said temperature reducing and demolding the resulting molded object within approximately 15 to 30 minutes after the charging of said mold.

9. A process as in claim 1 further comprising removing the resulting structural foam member from said mold within approximately 30 to 60 minutes of the charging of said mold and allowing said structural foam member to further assume its foamed shape at ambient temperatures.

10. A process as in claim 1 in which said foamable formulation contains a blowing agent.

References Cited in the file of this patent

UNITED STATES PATENTS

| | | |
|---|---|---|
| 1,574,658 | Johnston | Feb. 23, 1926 |
| 2,384,387 | Meyer | Sept. 4, 1945 |
| 2,404,636 | Humphrey | July 23, 1946 |
| 2,525,880 | Feldman | Oct. 17, 1950 |
| 2,722,719 | Altstadter | Nov. 8, 1955 |
| 2,737,503 | Sprague et al. | Mar. 6, 1956 |
| 2,767,436 | Noland et al. | Oct. 23, 1956 |
| 2,893,877 | Nickolls | July 7, 1959 |
| 2,898,626 | Alderfer et al. | Aug. 11, 1959 |
| 2,898,632 | Irwin et al. | Aug. 11, 1959 |
| 3,007,203 | Ammons | Nov. 7, 1961 |
| 3,058,161 | Beyer et al. | Oct. 16, 1962 |

FOREIGN PATENTS

| | | |
|---|---|---|
| 744,165 | Great Britain | Feb. 1, 1956 |

OTHER REFERENCES

Plastics World, "Foaming-Agent—Impregnated Polystyrene Beads Expand in Heated Molds to Controllable Sizes and Densities," March 1954, page 4.